Aug. 21, 1945.  J. KATZ ET AL  2,382,997
BIAS CUTTING MACHINERY
Filed June 26, 1943  5 Sheets-Sheet 1
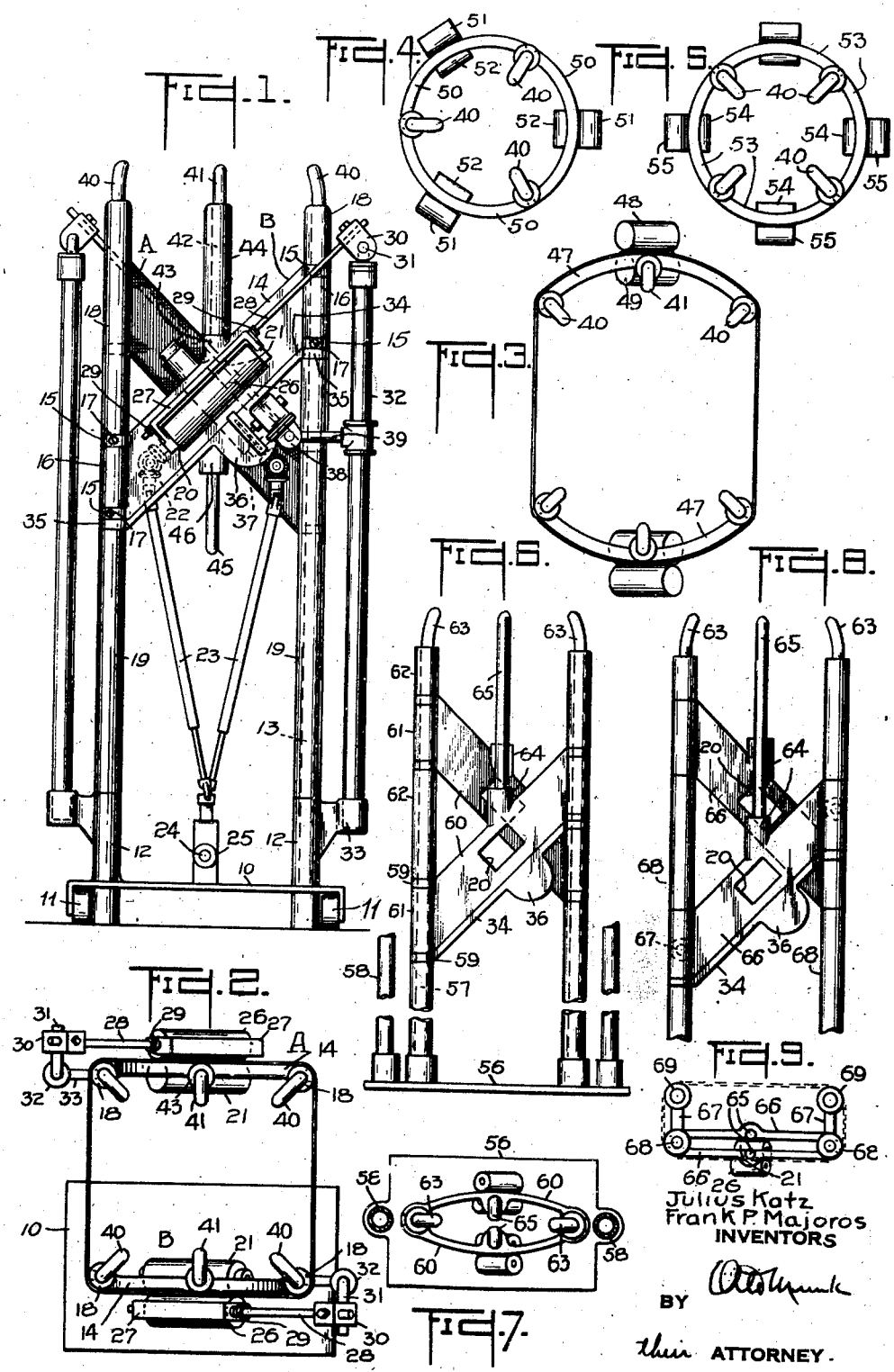
Julius Katz
Frank P. Majoros
INVENTORS
BY
their ATTORNEY.

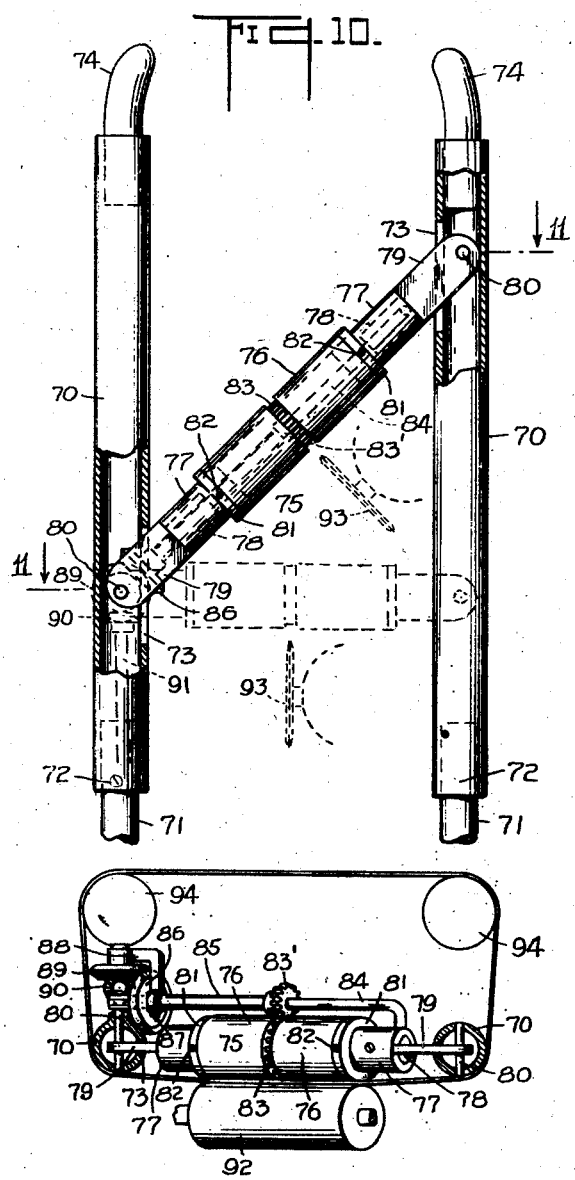

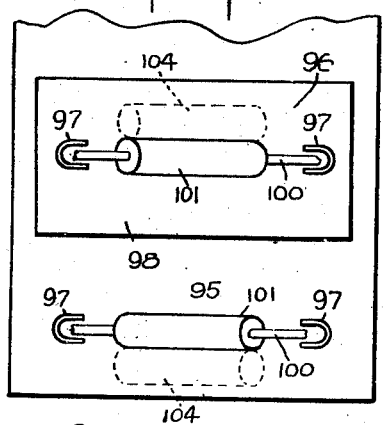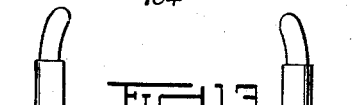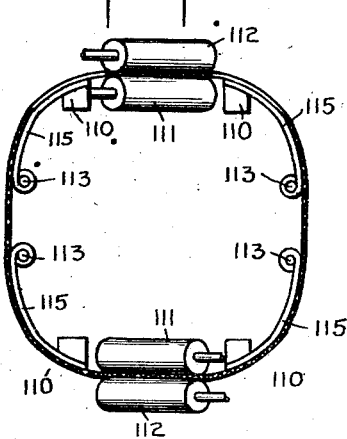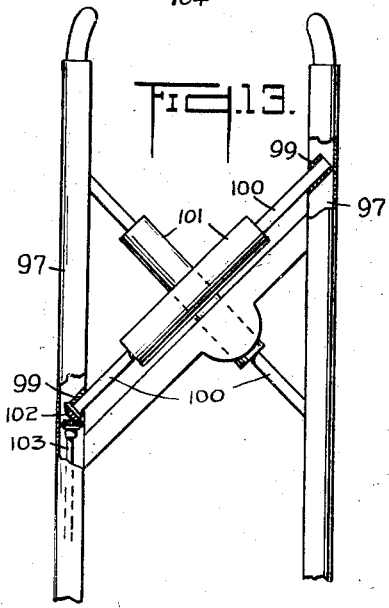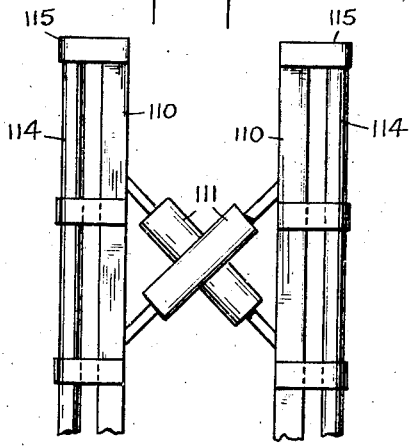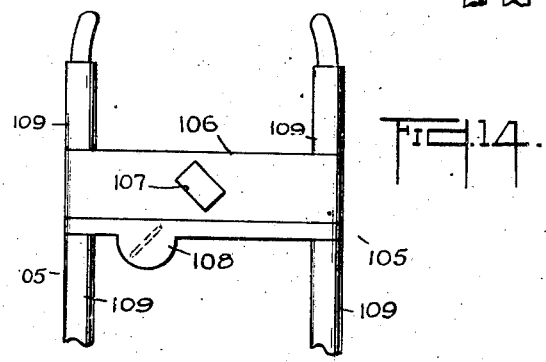

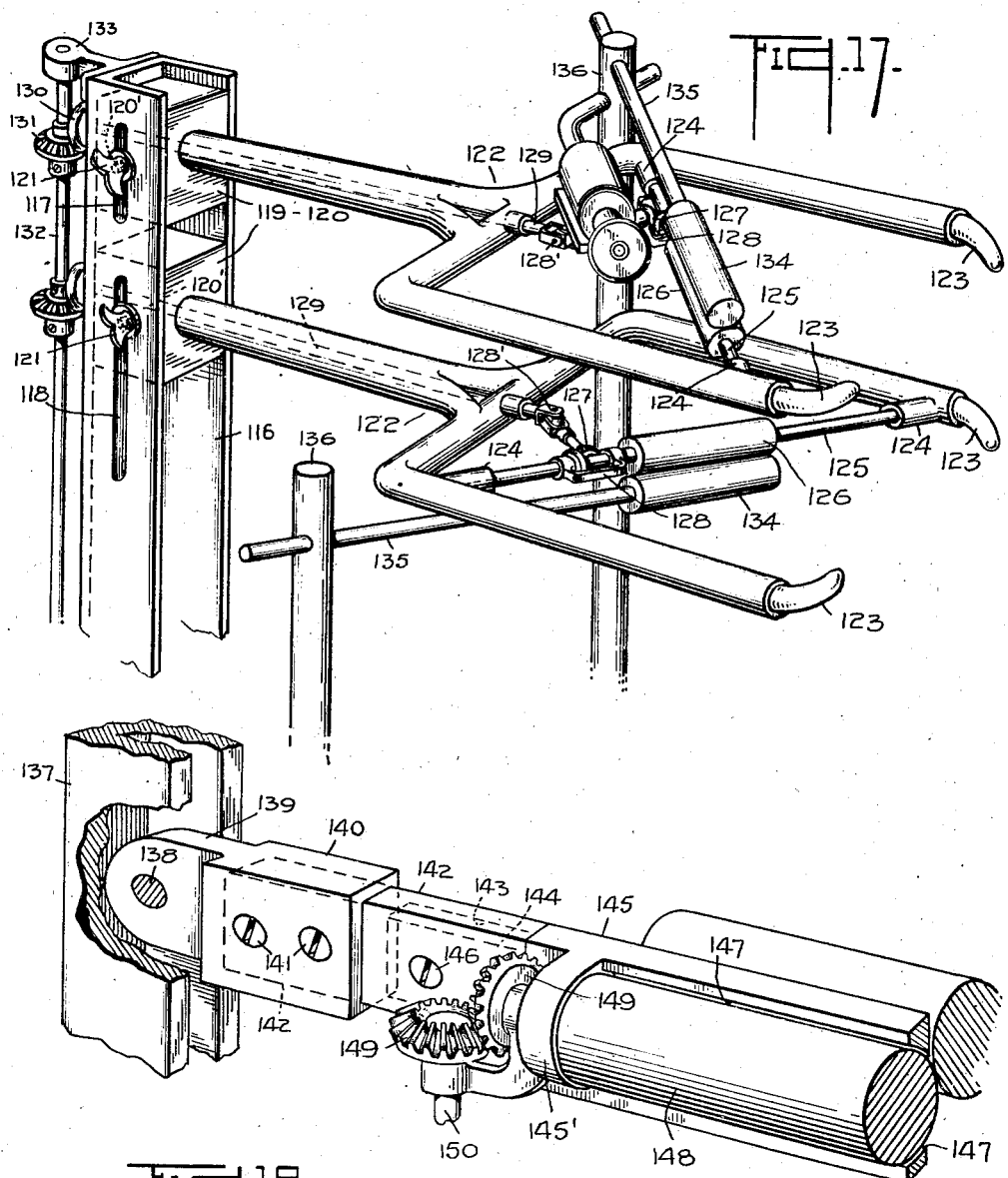

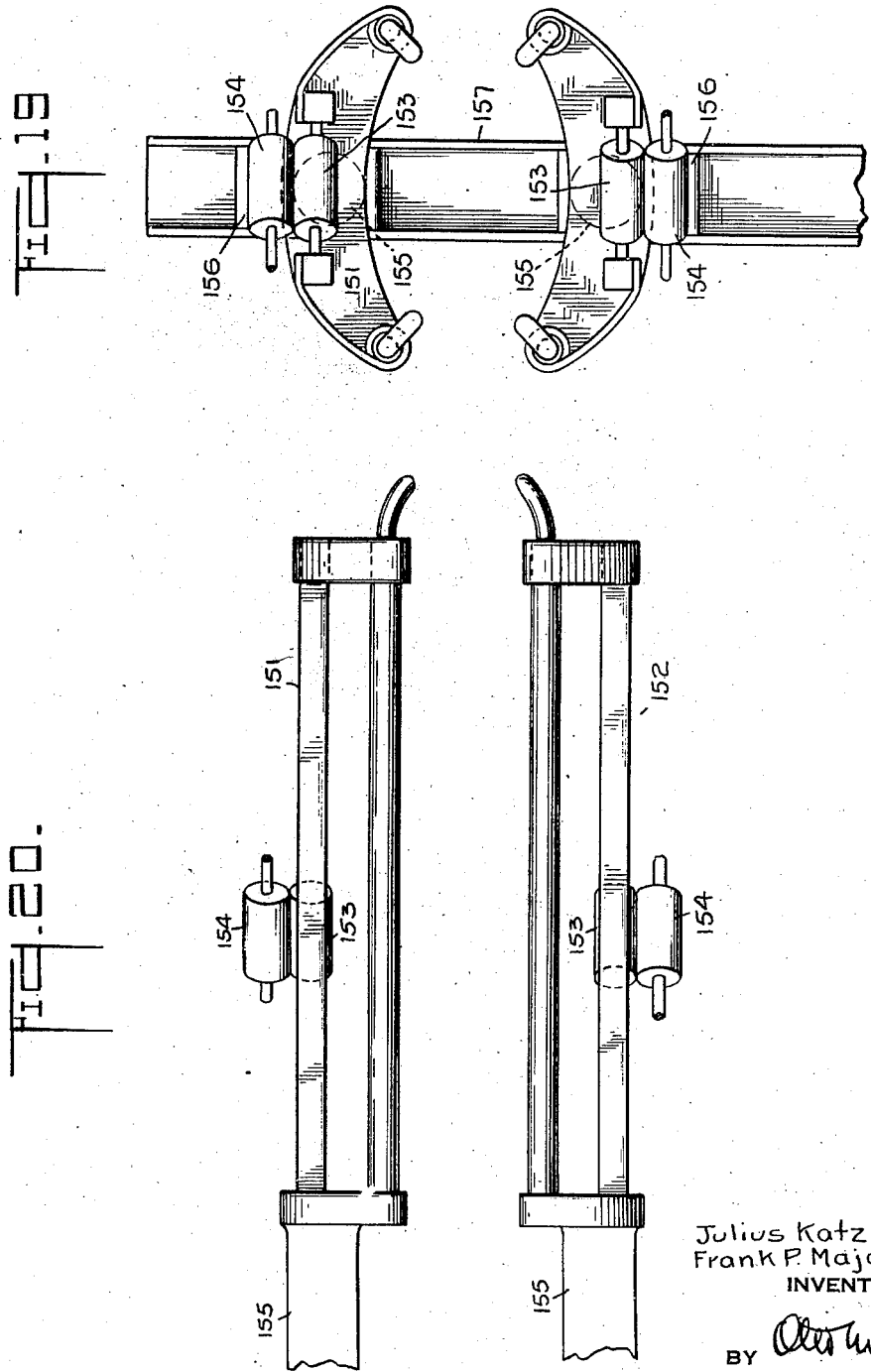

Patented Aug. 21, 1945

2,382,997

UNITED STATES PATENT OFFICE 2,382,997

BIAS CUTTING MACHINERY

Julius Katz, New York, and Frank P. Majoros, Brooklyn, N. Y., assignors to Superba Manufacturing Co., Inc., New York, N. Y., a corporation of New York Application June 26, 1943, Serial No. 492,438

18 Claims. (Cl. 164—61)

This invention relates generally to tubular material moving and bias cutting machines, as used for cutting strips spirally from a tubular fabric or textile material, and has reference more particularly to certain improvements in the construction and arrangement of the mandrel sections of such machines.

Bias cutting machines of this character are generally of two different types, one thereof comprising a mandrel associated with cutting and feeding instrumentalities for handling tubular textile materials descending in an approximate upright line onto the machine where it is fed downwardly in a rotary movement and cut so that the strip thus produced will be on a bias with respect to the weave of the material; the other type being characterized by the substantially lateral disposition of the mandrel and the absence of feeding means in place of which a pulling means is used beyond the mandrel to draw the tubular material from a rotatable support over the mandrel in a spiral direction, and a knife for cutting the material on the bias as it passes over the mandrel.

Each type of bias cutting machine is provided with a relatively large mandrel surface over which the material must be moved and guided into the cutting means, with the result that considerable static electricity is generated by the moving contact of cloth and mandrel during operation of the machine. The reaction of the material under these conditions is to cling to the mandrel and to any parts of the machine with which it is brought into contact, whereby soft lightweight materials become distorted and torn and heavier materials consume considerable power to move them against the natural holding action of the static electricity.

With the foregoing in mind, it is the purpose of the present invention to devise upright and laterally operating bias cutting machines with a minimum of mandrel surface to reduce friction between mandrel and material and at the same time retain and use in both types of machines, a feeding mechanism for moving the tubing operating directly in the mandrel sections as distinguished from those utilizing a rotatable support for the material and pulling means beyond the mandrel to pull the material thereover in a spiral direction.

A further object of the invention is to generally improve bias cutting machines by simplifying the construction to a minimum of moving parts and supporting means.

We accomplish the objects of the present invention by means of certain combinations and arrangement of parts hereinafter described, set forth in the appended claims and illustratively exemplified in the accompanying drawings, in which Figure 1 is an elevational view of a bias cutting machine showing flat mandrel sections, feed and pressure rollers and cutting mechanism;

Figure 2 is a top plan view of the machine shown in Figure 1;

Figure 3 is a top plan view of a bias cutting machine of the two section mandrel type, each section thereof being curved;

Figure 4 is a top plan view of a three section curved mandrel;

Figure 5 is a top plan view of a four section curved mandrel;

Figure 6 is an elevational view of a two section curved mandrel and a single set of supporting elements therefor;

Figure 7 is a top plan view of the machine shown in Figure 6;

Figure 8 is an elevational view of a single set of supporting elements and flat mandrel sections;

Figure 9 is a top plan view of the same;

Figure 10 is an elevational view, partly in section, of a feed roller frame of telescopic construction supporting a telescopic feed roller and drive therefor;

Figure 11 is a substantially transverse sectional view taken on lines 11—11 of Figure 10;

Figure 12 is a top plan view of a simplified form of a two section mandrel, showing feed rollers and pressure rollers operating without plates;

Figure 13 is a side elevational view of the same;

Figure 14 is a side elevational view of a bias cutter showing a straight laterally disposed mandrel plate;

Figure 15 is a top plan view of a two section curved mandrel;

Figure 16 is a side elevational view of the same;

Figure 17 is a perspective view of a horizontal mandrel comprising a movable top and bottom section;

Figure 18 is a perspective view of a feed roller supporting and driving arrangement;

Figure 19 is an end view of a horizontal mandrel composed of the curved sections of Figures 15 and 16 and the supporting arrangement of Figure 17;

Figure 20 is a side elevational view of the same.

Referring to the drawings and particularly to Figures 1 and 2, 10 denotes a movable mandrel supporting platform mounted on rollers 11 and adapted to move towards and away from the fixed section A of the mandrel as hereinafter described. The mandrel unit of the movable section B comprises a pair of spaced upright sockets 12 mounted on the platform 10, each socket supporting an upright post or spindle 13. The spindles 13 support an angularly disposed mandrel plate 14 which, in this modification, is a flat relatively narrow plate terminating at opposite ends in laterally disposed adjustable upper and lower annular split eyes 15. The plate 14 operates preferably at the fixed angle of forty-five degrees, as illustrated in Figure 1, although any degree may be elected depending upon the degree of bias to be cut. As a result the axes of the eyes 15 in addition to coinciding with those of the spindles 13 are at forty-five degrees with respect to the top and bottom sides of the plate. Thus, when the eyes are placed over the spindles and arranged at the desired elevation, the plate proper will be disposed at the desired ninety degree angle with respect to the normal horizontal and vertical lines of the machine. Intermediate the eyes 15 and embracing the spindles are rollers 16 and the eyes themselves carry set screws 17 to fix the plates in position upon the spindles 13. Above and below the eyes 15 are further rollers 18 and 19, which are loosely carried on the spindles, and which provide the material being processed with rolling surfaces about which it is moved downwardly in a spiral direction with a minimum of friction.

The mandrel plate 14 is provided with a feed roll slot 20, the major axis thereof being disposed at right angles to the bias cut to be made, as in the case of many of the well known bias cutting machines. Mounted in the slot 20 is a feed roller 21 which is rotated through a miter gear connection 22, extensible shaft drive 23 projecting upwardly from and being operatively connected to a main driving shaft 24. The shaft 24 is supported in bearing hangers 25, one thereof being mounted on the platform 10 and the other being fixed in the base of the stationary portion of the machine. The shaft 24 is driven by a motor or by any other convenient means not shown but familiar to one having knowledge of machines of this character. Pressure is exerted against the feed roller 21 and material being processed to cause same to feed in the desired direction by means of a pressure roller 26 which is supported in position before the mandrel plate 14 and feed roller 21 in a yoke 27 swingably disposed at the free end of an inclined rod 28. The rod 28 carries spring connections 29 to yieldably press the yoke 27 and its roller 26 in the direction of the feed roller. The upper end of the rod 28 is adjustably mounted in a bracket 30 which is pivotally carried by an angle bar 31 projecting from the upper end of an upright post 32. The post 32 is supported in a socket 33 arranged at the side of the socket 12 and projects parallel to the adjacent spindle 13.

Projecting parallel to and beneath the plate 14 is a bridge piece 34 having eyes 35 at its ends to embrace the spindles 13 underneath the lower eyes of the plate, the mid portion of the piece 34 being provided with an enlarged depending section 36 which acts as a support for the moving material being processed during the cutting operation. A rotary disc knife blade 37 is used to perform the cutting operation and is adjustably carried at the proper angle, which is at right angles to the axis of the feed roller, on a bracket 38 supported on an arm 39 of the upright post 32.

The material which is delivered from an overhead supply, is in tubular form and must be opened so as to allow the same to be brought in over the upper ends of the spindles 13. This is accomplished by providing the upper ends of the spindles 13 with slightly inwardly curved horn shaped fingers 40. Each pair of spindles 13 carries a third horn 41, which is formed by an upright spindle 42 mounted at its lower end in a socket 43 integral with the upper side of the plate 14, and which carries a roller 44 between the socket 43 and the horned upper end to aid in affording a nearly frictionless support for the downwardly feeding material. A depending guide 45 is supported in a socket 46 integral with the underside of the plate 14 or bridge piece 34, for the purpose of preventing the material being cut or just prior to the cut from being drawn inwardly between the mandrel supporting spindles 13.

The mandrel section just described is that which is known as the movable section B and is consequently carried upon the movable platform 10. As illustratively exemplified in Figure 2, the bias cutting machine comprises a stationary mandrel section as well as a movable section for the purpose of accommodating various sizes of tubular material to be processed. The fixed section A in this instance is in all respects the same as the movable section, except that the bridge piece 34 is omitted and the spindles 13 instead of being mounted on the movable platform 10 are supported in sockets 12 fixed in the base of the machine, upon which the rollers 11 of the platform 10 are adapted to roll. The same reference characters are used to designate corresponding parts of both the movable and fixed mandrel sections A and B, respectively.

In Figure 3 the structure shown utilizes the same supporting elements illustrated in Figures 1 and 2, the only change being in the shape of the mandrel plates 47, which are curved, and which are, as a result, adapted to the use of relatively short pressure and feed rollers 48 and 49.

Figure 4 shows a mandrel of three curved sections 50, each thereof being provided with pressure and feed rollers 51 and 52, and each having the characteristic narrow width of the plates shown in Figure 1.

Figure 5 illustrates the further modification utilizing four sections 53 each thereof having feed and pressure rollers 54 and 55.

Figures 6 and 7 show a single mandrel support. The bias cutter, according to this arrangement, comprises a base plate 56, upright spindles 57 and 58, the former receiving the eyes 59 of convex mandrel plates 60. The eyes 59 on one side of the device rest one directly above the other while on the opposite side the eyes are separated by a roller 61. Further rollers 62 are arranged on the spindles 57 to provide rolling surfaces over which the material moves. The upper ends of the spindles 57 are provided with inwardly curved horns 63 and each plate at its outwardly curved mid portion carries an upwardly directed socket 64 and upright horn 65 which is curved inwardly at its upper end. Set screws are provided in the eyes to set the position of the plates. The spindles 58 are provided, as in the arrangement illustrated in Figure 1, to support the pressure rollers and cutting unit, not illustrated.

Figures 8 and 9 illustrate a modification of the structure of Figures 6 and 7, in which the narrow mandrel plates 66 are flat and of the type shown in Figures 1 and 2. The mandrel may have its capacity increased in this modification by mounting lateral extensions 67 on the supporting uprights 68 and carrying on the extensions upright rollers 69.

In the structures described up to this point the apparatus actually comprises mandrel plates with feed and pressure rollers for moving the tubular material downwardly in a spiral over the plates and into the path of the cutter to produce a bias strip.

Referring now to Figures 10 and 11, the mandrel plates are entirely eliminated and the material is supported and fed by a set of pressure and feed rollers which move the tube about upright spindles in a downward spiral movement. In the present modification, 70 denotes at least two spaced upright tubular posts or spindles which are axially adjustable with respect to each other and to the supporting level by means of stationary upright rods 71. The upper ends of the rods 71 receive the lower ends of the posts 70 which telescope over the rods and are fixed thereto by means of set screws 72. Each tubular post 70 is provided with a longitudinally disposed slot 73 adjacent one end thereof. In the embodiment illustrated, the left post has its slot 73 adjacent the lower end while the slot 73 of the right post is adjacent its upper end. The slots 73 face each other across the space between posts and the upper ends of the latter are provided with inwardly curved extensions 74 to open the tubing as it descends onto the machine.

A feed roller 75 is arranged between the posts 70, and comprises a center section 76, which is rotatably mounted and supported at opposite ends on cylindrical shafts 77 projecting into the bore of the roller 75, the shafts 77 being provided with bores to receive the ends of bearing shafts 78 which are integral with flattened sections 79 adapted to project into slots 73 and pivot about pins 80. The pins 80 project through the walls of the posts 70. In accordance with this arrangement both ends of the telescopic feed roller unit are pivotally connected to the posts 70, whereby relative upright adjustment of either post will change the angle of the feed roller 75. The feed roller 75 is prevented from shifting axially of the two shafts 77 by means of collars 81 abutting the ends of the roller and fixed to the shafts 77 by set screws 82.

Rotary movement is imparted to the feed roller 75 through a driving mechanism comprising a gear 83 arranged in a channel in the mid portion of the roller, a pinion 83' slidably mounted on a rod 84 disposed parallel to the roller 75 and mounted at its outer end in the shaft 77, said pinion meshing with the gear 83. The opposite end of rod 84 is pivotally supported on the pin 80 of the left post 70, so as to enable the rod 84 to assume the same angular position as that of the feed roller 75 in any of its positions. The pinion 83' is driven through a tubular shaft 85 slidable longitudinally and rotatably on the rod 84 and connected at one end to the pinion 83' and at the opposite end to bevel gear 86. The tubular shaft 85 is mounted in a bearing 87 adjacent the bevel gear 86 and carried at one end of an angularly shaped bracket 88, the opposite end being provided with a second bevel gear 89 in mesh with bevel gear 86 and a third bevel gear 90 which is mounted at the upper end of an upright shaft 91 receiving its rotary movement from the type of drive connection illustrated in Figure 1. The axes of the pin 80 and bevel gear 89 are coalined, so as to allow the angle of the shaft 85 to vary without interfering with the driving operation of the feed roller 75.

A pressure roller 92 is arranged and supported over the feed roller 75 in the same manner as that illustrated and described in connection with the other modifications, particularly Figures 1 and 2. The cutter element 93 is illustrated in dotted lines in Figure 10, because a more detailed illustration seems unnecessary in view of the arrangement shown in Figure 1 of the same type of apparatus.

In order to afford a proper positioning of the tubular material to be cut while it is in the course of being fed spirally into the path of the cutter 93, we provide upright posts 94, one thereof being spaced directly behind each post 70. In this manner the material descends spirally in an approximate rectangular form as illustratively exemplified in Figure 11.

According to the construction of Figures 10 and 11, the present invention accomplishes the task of feeding tubular material in a downwardly spiral direction into the path of a cutter without the use of mandrel plates or sections of any kind. This arrangement also provides a simple means by which the capacity of the machine and direction and angular degree of the bias cut are adjustable in any direction, which may fall to a bias cutting machine, the adjustability determining the positions of the warp and filing threads with respect to the sides of the web.

Referring now to the modifications of Figures 12 and 13, 95 denotes the fixed section of a mandrel and 96 the movable section. The fixed and movable sections 95 and 96 are supported on upright U-shaped posts 97, the posts of the movable section being mounted on a movable platform 98 in much the same manner as that shown in Figure 1. The posts are arranged in pairs with their open sides directed toward each other. Bearings 99 are arranged at the proper angles in the U-shaped posts and rotatably support shafts 100 projecting between the pairs of posts at preferably a ninety degree angle with respect to the perpendicular lines of the posts. Each shaft 100 carries at its mid portion, between a pair of posts, a feed roller 101, which is driven through a pair of miter gears 102 connecting the lower end of the shaft 100 to an upright shaft 103 arranged in one of the U-shaped posts 97 of a pair, and driven from a driving unit of the character used in the modification of Figure 1. The pressure roller 104, shown in dotted lines in Figure 12, is supported and operated in the manner of the pressure roller of Figure 1. The present invention, according to the construction of Figures 12 and 13, is of a particularly simple and inexpensive design which will operate with a minimum of power and which will handle efficiently any tubular material to be cut into a bias strip.

Figure 14 illustrates a further modification of bias cutting device, consisting of two sections, either movable or stationary, which comprise spaced upright posts 105, a straight mandrel plate 106, laterally mounted at its ends on a pair of posts 105 and provided with a feed roller slot 107 disposed at an inclination, preferably ninety degrees, with respect to the vertical axis of the posts. Under the mandrel plate 106 is a cutter plate 108 also supported at its ends on the posts 105. Above and below the plates 106 and 108 the posts are provided with rollers 109 to give a rolling support to the tubular material being cut into a bias strip.

The modification of Figures 15 and 16, comprises two sections one movable and the other stationary, each section consisting of two outside upright posts 110 spaced from each other to accommodate a feed roller 111 and pressure roller 112, and two inside upright spindles 113, which are spaced apart a greater distance than the outside posts, and which comprise rollers 114 to give rolling support to the material. The upper ends of the post 110 and spindle 113 on each side of the section are connected by a curved band 115, which acts as a guide for the tubular material in its movement onto the bias cutting machine.

Figures 17 to 20 are directed to a bias cutting machine of the lateral or horizontal type. This construction offers all the advantages of the upright bias cutting machine in a horizontal machine while retaining all the advantages of the latter.

According to Figure 17 of the drawings, 116 designates an upright substantially U-shaped supporting standard. The bottom and side walls of the standard adjacent the upper end thereof are provided with alined upper and lower sets of vertical slots 117 and 118, respectively. Adjustably mounted in the open side of the standard are upper and lower mandrel supporting blocks 119 and 120. The upper and lower blocks 119 are provided with oppositely projecting threaded pins 120', which project through the upper and lower slots 117 and 118 to the outside of the standard 116, and which receive nuts 121 to clamp the blocks in their adjusted positions with respect to the standard.

The upper and lower blocks 119—120 carry top and bottom mandrel forks 122, each thereof comprising a stem portion projecting from the block to assume a horizontal position and a forked end portion terminating in inwardly curved fingers 123 adapted to open the tubular material, as it feeds into the mandrel. Each fork 122 is provided with bearings 124 on the inner sides of the arms to carry a shaft 125 on which a feed roller 126 is rotatably mounted. The shaft 125 and roller 126 are arranged at the proper angle with respect to the longitudinal axis of the forks to feed the material in a circular spiral direction towards the stem end. Each feed roller 126 is rotated through a miter gear connection 127 carried in a bracket 128 on shaft 125, and a universal joint arrangement 128' with a driven shaft 129 disposed longitudinally of the stem portion of the fork. The shaft 129 projects rearwardly through the block 119 and rear slot 117—118 to receive a bevel gear 130 which meshes with a bevel gear 131 keyed to an upright shaft 132 supported in bearings 133 on the upper and lower ends of the standard 116. The upright shaft 132 is driven by any power means not shown.

Pressure rollers 134 are supported on rods 135 and held in rolling contact with the material supported on the feed rollers. The rods 135 are carried on and project from upright posts 136 arranged at the sides of the mandrel forks, as illustrated.

Figure 18 illustrates a modified arrangement for supporting a feed roller. In this instance the device comprises a U-shaped upright standard 137 for each side of the machine and mounted in each standard 137 is pin 138 projecting between the side walls. Pivotally mounted on the pin 138 is the flat portion 139 of a socket 140, which projects outwardly of the open side of the standard, and which is provided with set screws 141 in its sides. Telescopically supported in the socket 140 is the end of a section 142 which is fixed in the socket by tightening of the set screws 141. The section 142 is provided with a rectangular opening 143 at its outer end to receive the tongue 144 of the feed roll bracket 145. A set screw 146 in the section 142 is adapted to rigidly affix the latter and the bracket 145 together. The telescopic arrangement of the parts just described is devised to allow adjustment of the standards to bring about different angular feeding possibilities as in the device illustrated in Figures 10 and 11. The bracket 145 comprises a bar having inwardly projecting ears 145' adjacent opposite ends and a longitudinal feed roll slot 147 through which a feed roller 148 projects, the roller being mounted in bearings in the ears 145' and carrying a miter gear connection 149 just beyond one of the ears. The gear connection 149 is driven from an upright shaft 150 which is operated from a remote point in the machine not shown.

Referring now to the construction illustrated in Figures 19 and 20, it is pointed out that this arrangement is virtually the same as shown in Figures 15 and 16, except that the mandrel sections are disposed horizontally instead of vertically. Further the supporting means of the modification of Figure 17 is combined with the mandrel sections of Figures 15 and 16.

Briefly this construction comprises upper and lower mandrel sections 151 and 152, respectively, each having feed and pressure rollers 153 and 154 and a stem 155 projecting laterally to be supported in a block 156 adjustable vertically in a U-shaped upright supporting standard 157.

It will be understood that in illustrating the various modifications of the present invention, certain parts, which are shown in one form, are not always repeated in other forms, such omissions being made in the interest of simplicity. However, it is intended that each modification is able to handle and move a tubular material and to cut same into a continuous bias strip. It is also to be noted that certain elements of one embodiment may be interchanged for corresponding elements of other modifications.

The present invention comprehends the feeding material tubings over mandrels whether horizontal or upright, by means of feeding elements mounted directly in the mandrel, whereby a positive accurate spiral movement of the material tubing over the mandrel is assured.

Having described our invention and the manner in which the same operates, what we claim and desire to secure by Letters Patent is:

1. A machine for cutting bias strips, comprising spaced supporting sections which are substantially the whole supporting means for the tubular fabric to be cut and which are provided with partially rotary tubular supports over which the tubular fabric is moved in a spiral direction, a cutter, and feeding means disposed transversely of and intermediate said supporting sections to grip the fabric and advance it spirally over the supporting sections and into the path of the cutter.

2. A machine for cutting bias strips, comprising spaced supporting sections which are substantially the whole supporting means for the tubular fabric to be cut and which are provided with partially rotary tubular guides and rollers over which the tubular fabric is continuously moved in a spiral direction, a cutter, and feeding means disposed transversely in the sections to engage the fabric and advance it spirally over the guides and into the path of the cutter.

3. A machine for cutting bias strips, comprising mandrel sections composed of spaced tubular supports about which tubular fabric is adapted to be moved in a spiral direction, narrow plates spanning the spaces between the supports of the section and being provided with slots, feed means operating in said slots to advance the material in a spiral direction and longitudinally of the sections, and a cutter to separate the material into a bias strip as it emerges from said feed means.

4. A machine for cutting bias strips from tubular fabric, comprising spaced tubular supports arranged in groups and adapted to receive the tubular fabric, narrow mandrel plates connecting the supports of each group and being disposed at an angle corresponding with the angle of the bias to be cut, feeding means arranged in each plate and adapted to move the material in a spiral direction, and a cutter to separate the material emerging from the feeding means into a continuous bias strip.

5. A machine for cutting bias strips from tubular fabric, as claimed in claim 4, in which said mandrel plates are convexly curved to cause them to conform to the curve of the tubular material.

6. A machine for cutting bias strips from tubular material, as claimed in claim 4, in which said mandrel comprises at least two parts, each thereof being convexly curved and when combined with each other form a closed mandrel.

7. A machine for cutting bias strips from tubular material, comprising a plurality of upright supporting posts spaced radially of a center point, relatively narrow curved mandrel plates interposed between said supporting posts and provided with center openings and means to removably and adjustably attach the plates to the said posts, rollers on the posts above and below the plates, means arranged in the center opening to feed the material spirally over the plates, and a cutter to separate the material into a bias strip as it leaves the feed means.

8. A machine for cutting bias strips from tubular material, as claimed in claim 1, in which the outer ends of the tubular supports are provided with curved horn shaped projections to open the tubular material being advanced to the machine.

9. A machine for cutting bias strips from tubular textile material, comprising telescopic supports, a feed roller supporting link pivotally attached to said supports at its opposite ends whereby relative longitudinal adjustment of the telescopic supports changes the angle of the feed roller support, a feed roller attachment rotatable on said latter support, and cutting means to separate the material along a line running parallel to the direction of movement of the material.

10. A machine for cutting bias strips from tubular textile material, comprising tubular supports having openings in their inner sides, telescopic supports projecting into the openings of the tubular supports and forming a link between the latter, pivots attaching each end to its support, a feed roller carried on the mid portion of the link, whereby in any angular position thereof the roller will turn in the direction of the warp of the material to feed the same over the tubular supports, means for rotating the feed roller, and means for separating the material into a continuous strip as it leaves the feed roller.

11. A machine for cutting bias strips from tubular textile material, as claimed in claim 10, in which the means for rotating the feed roller comprises a gear disposed in an annuar groove in said feed roller, a rod parallel to the axis of the roller upon which a pinion is slidably and rotatably mounted, said rod being pivotally mounted at one end on one of said pivots, a gear connection for the pinion and a drive shaft to said gear connection, whereby rotary movement is imparted to the roller in any angular position thereof.

12. A machine for cutting bias strips from tubular material, comprising fixed and movable mandrel sections, each thereof having a pair of upright U-shaped supporting standards, the open sides thereof facing each other, feed rollers disposed at a predetermined angle with respect to the standards and mounted at their ends in bearings arranged in the open sides of the standards, a cutter to separate the material as it passes one of the feed rollers to form a bias strip, and a gear connection for the end of the roller journalled in one of the standards to impart rotary movement to the roller.

13. A machine for cutting bias strips from tubular material, comprising upright posts spaced apart and provided with rolling surfaces, a mandrel plate of relatively narrow width and disposed at an angle to said posts, feed means disposed in said plate at a predetermined angle with respect thereto to move the tubular material spirally over the rolling surfaces of said posts, and cutting means to separate the material being fed into a bias strip.

14. A machine for cutting bias strips from tubular textile material, comprising an upright supporting standard, a laterally disposed top and a bottom mandrel section supported in said standard, consisting of laterally spaced arms with rolling surfaces, a feed roller arranged between said arms of each section, pressure rollers in rolling contact with said feed rollers to move material spirally over said sections, and means for separating said material into a continuous bias strip upon leaving one of said feed and pressure rollers.

15. A machine for cutting bias strips, as claimed in claim 14, in which said spaced arms of each section are joined at their inner ends by a cross piece having a stem projecting towards said standard, blocks independently adjustable in said standard, and means operated through said standard and stem and connected to said feed roller to rotate the same.

16. A machine for cutting bias strips from tubular textile fabric, comprising a sectional mandrel each section consisting of two pairs of supports, curved bands embracing posts of each pair to support the tubular material, feed and pressure rollers arranged in each mandrel section between the posts, to move the tubular fabric spirally over said bands and posts, and cutting means in the path of the moving fabric to separate the same into a continuous bias strip.

17. A machine for cutting bias strips from tubular textile fabric, as claimed in claim 16, including a supporting structure for said mandrel sections to hold them in a horizontal position and to arrange the sections so as to cause one to be directly over the other.

18. A machine for cutting bias strips from tubular material, comprising a mandrel of spaced parallel guide members capable of axial and transverse adjustment, and a feed and pressure roller fixture pivotally mounted at its ends in said guide members, comprising a telescopic bar having a longitudinal feed roller opening, a feed roller mounted in said opening, means for rotating the feed roller, and a pressure roller in rolling contact with the surface of feed roller projecting through the opening, whereby material disposed between said feed and pressure rollers will be moved along the mandrel in a direction at an angle to the axes of the rollers.

JULIUS KATZ.
FRANK P. MAJOROS.